United States Patent
Wu et al.

(10) Patent No.: US 11,392,626 B2
(45) Date of Patent: Jul. 19, 2022

(54) METHOD AND APPARATUS FOR ACQUIRING MAP DATA (71) Applicant: BEIJING BAIDU NETCOM SCIENCE AND TECHNOLOGY CO., LTD., Beijing (CN)

(72) Inventors: Tong Wu, Beijing (CN); Gaifan Li, Beijing (CN); Yan Feng, Beijing (CN); Yijun Yuan, Beijing (CN); Pengfei Yuan, Beijing (CN); Jie Huang, Beijing (CN); Yongyi Sun, Beijing (CN)

(73) Assignee: APOLLO INTELLIGENT DRIVING TECHNOLOGY (BEIJING) CO., LTD., Beijing (CN)

( * ) Notice: Subject to any disclaimer, the term of this patent is extended or adjusted under 35 U.S.C. 154(b) by 0 days.

(21) Appl. No.: 16/921,024

(22) Filed: Jul. 6, 2020

(65) Prior Publication Data
US 2021/0097093 A1 Apr. 1, 2021

(30) Foreign Application Priority Data
Sep. 27, 2019 (CN) .......................... 201910925816.8

(51) Int. Cl.
G06F 16/29 (2019.01)
G06F 16/23 (2019.01)
(Continued)

(52) U.S. Cl.
CPC ............ *G06F 16/29* (2019.01); *G06F 16/215* (2019.01); *G06F 16/2379* (2019.01); *G06F 16/258* (2019.01); *H04L 67/52* (2022.05)

(58) Field of Classification Search
None
See application file for complete search history.

(56) References Cited

U.S. PATENT DOCUMENTS

2008/0249705 A1* 10/2008 Matsuda ................ G01C 21/32
701/532
2012/0166074 A1* 6/2012 Weng ..................... G01C 21/32
701/409
(Continued)

FOREIGN PATENT DOCUMENTS

EP 0921509 A2 6/1999
EP 3244165 A2 11/2017
(Continued)

OTHER PUBLICATIONS

Extended European Search Report for EP Application No. 20166306.9, dated Feb. 23, 2021, 7 pages.
(Continued)

Primary Examiner — Christopher J Raab
(74) Attorney, Agent, or Firm — Fay Sharpe LLP (57) ABSTRACT The present disclosure discloses a method, an apparatus, an electronic device and a medium for acquiring map data, and relates to the field of intelligent transportation. A specific implementation solution is: determining a target areas of interest in a map, wherein the map is divided into at least two areas of interest; sending a data acquisition instruction to data acquisition terminals to acquire the map data in the target areas of interest; and receiving the map data fed back from the data acquisition terminal and updating the target areas of interest in the map according to the map data.

14 Claims, 5 Drawing Sheets (51) Int. Cl.
*G06F 16/215* (2019.01)
*G06F 16/25* (2019.01)
*H04L 67/52* (2022.01)

(56) References Cited

U.S. PATENT DOCUMENTS

| | | | |
|---|---|---|---|
| 2014/0005922 A1* | 1/2014 | Bank | G01C 21/3641 |
| | | | 701/423 |
| 2017/0277716 A1* | 9/2017 | Giurgiu | G06F 16/2365 |
| 2017/0332198 A1* | 11/2017 | Dannenbring | H04W 4/022 |
| 2020/0141734 A1* | 5/2020 | Casarez | G01C 21/206 |

FOREIGN PATENT DOCUMENTS

| | | |
|---|---|---|
| WO | 2019000417 A1 | 1/2019 |
| WO | 2019063630 A1 | 4/2019 |

OTHER PUBLICATIONS

Office Action for Japanese Application No. 2020-114841, dated Aug. 31, 2021, 2 pages.

* cited by examiner

METHOD AND APPARATUS FOR ACQUIRING MAP DATA

CROSS REFERENCE TO RELATED APPLICATION

This application claims priority under 35 U.S.C. § 119(a) on Chinese Patent Application No. 201910925816.8, filed with the State Intellectual Property Office of P. R. China on Sep. 27, 2019, the entire contents of which are incorporated herein by reference.

TECHNICAL FIELD

Embodiments of the present disclosure relate to computer technologies, more particularly, to intelligent transportation technologies, and specifically, to methods, apparatuses, an electronic device and a medium for acquiring map data.

BACKGROUND

Data in a map, especially a high-definition map, needs to be constantly updated according to actual environment conditions of geographic positions. The prior art uses a map crowdsourcing model to acquire map data. That is, various terminals, such as mobile terminals and vehicle-mounted terminals of users, are mobilized to acquire data on surrounding environments at the same time as the users move, and then the data is updated to a cloud server, so that the cloud server integrates data acquired by different terminals to update the map.

However, a problem with the existing map crowdsourcing model is that a large number of terminals may be acquiring map data and transmitting the map data to the cloud server. For example, vehicle-mounted terminals can acquire point cloud data. Since the amount of data of the point cloud data is very large, the cost of acquisition conducted by a vehicle and a bandwidth occupied by data backhaul are large, wasting resources.

SUMMARY

Embodiments of the present disclosure provide methods, apparatuses, an electronic device and a medium for acquiring map data, which may solve a problem of a high cost of acquisition conducted by a vehicle and a large bandwidth occupied by data backhaul in the existing method for acquiring map data.

According to a first aspect, embodiments of the present disclosure provide a method for acquiring map data, applicable to a server, comprising: determining target areas of interest in a map, wherein the map is divided into at least two areas of interest; sending a data acquisition instruction to data acquisition terminals to acquire the map data in the target areas of interest; and receiving the map data fed back from the data acquisition terminals, and updating the target areas of interest in the map according to the map data.

The above embodiments of the present disclosure have the following advantages or beneficial effects. By determining the target areas of interest and sending the data acquisition instruction to the data acquisition terminals to acquire the map data in the target areas of interest, the present disclosure implements the technical effect of acquiring the map data as necessary, thereby reducing unnecessary acquisition of redundant data.

Optionally, the areas of interest in the map are divided on a basis of a topological structure of roads, each area of interest comprising at least one road.

The above embodiments of the present disclosure have the following advantages or beneficial effects. By dividing to obtain the areas of interest on a basis of a topological structure of roads, the areas of interest may be divided more accurately and satisfy various requirements for updating the maps. In addition, a vehicle travel path usually takes a road as a unit.

Optionally, determining the target areas of interest in the map comprises: in response to changes in the map data, determining the areas of interest corresponding to the positions of the changes as the target areas of interest.

The above embodiments of the present disclosure have the following advantages or beneficial effects. By taking the position that changes corresponding to the change in the map data as the target areas of interest, the target areas of interest may be adjusted in real time based on the change in the map data, making the acquisition of the map data more flexible.

Optionally, the map data comprises raw environmental data and/or map-formatted data, wherein the format of the raw environmental data comprises at least one of images, laser point cloud data and satellite positioning data.

Optionally, sending the data acquisition instruction to the data acquisition terminals to acquire the map data in the target areas of interest comprises: obtaining current positions of the data acquisition terminal; and sending the data acquisition instruction to the data acquisition terminals with the current positions within the target areas of interest so as to acquire the map data in the target areas of interest.

The above embodiments of the present disclosure have the following advantages or beneficial effects. By controlling the data acquisition terminals with the current positions within the target areas of interest to acquire the map data, the map data may be obtained quickly for map updates, and thus maps may be updated more efficiently.

Optionally, sending the data acquisition instruction to the data acquisition terminals to acquire the map data in the target areas of interest comprises: sending the data acquisition instruction carrying identifiers of the target areas of interest to the data acquisition terminals so as to instruct the data acquisition terminals to acquire the map data when the data acquisition terminals are located within the target areas of interest.

The above embodiments of the present disclosure have the following advantages or beneficial effects. By instructing the data acquisition terminal to acquire the map data when the data acquisition terminals are located within the target areas of interest according to the identifiers of the target areas of interest such that the data acquisition terminal may perform the acquisition of the map data immediately upon the data acquisition terminal are located within the target areas of interest, the speed of the acquisition of the map data may be increased, thereby improving the efficiency for updating the map.

Optionally, sending the data acquisition instruction to the data acquisition terminals to acquire the map data in the target areas of interest comprises: determining redundancy of the required map data according to the requirements for updating the map; and sending the data acquisition instruction to a corresponding number of data acquisition terminals according to the redundancy, to acquire the map data in the target areas of interest.

The above embodiments of the present disclosure have the following advantages or beneficial effects. According to the redundancy of the required map data, a corresponding number of a data acquisition terminal are controlled to acquire the map data. In this way, the map data may be acquired as necessary, thereby avoiding too much unnecessary redundant data to be acquired, and ensuring the accuracy and reliability of the updated map.

Optionally, sending the data acquisition instruction to the data acquisition terminals to acquire the map data in the target areas of interest comprises: determining redundancy of the required map data according to updating requirements of the map; and sending the data acquisition instruction to the data acquisition terminals exceeding the redundancy, to acquire the map data in the target areas of interest; and after receiving the map data fed back from the data acquisition terminals, the method further comprises: when the amount of the received map data reaches the required redundancy, sending an acquisition stop instruction to the data acquisition terminals.

The above embodiments of the present disclosure have the following advantages or beneficial effects. By controlling the data acquisition terminals exceeding the redundancy to acquire the map data, the feedback speed of the acquired map data is accelerated. When the amount of the received map data reaches the required redundancy, the acquisition stop instruction may be sent to the data acquisition terminals. In this way, the acquisition of the map data may be stopped immediately once the requirements are satisfied, thereby reducing the bandwidth occupied for sending the map data back to the server.

Optionally, the data acquisition instruction comprises: a map data filtering rule for instructing the data acquisition terminals to filter the acquired map data according to the map data filtering rule and to feed back the filtered map data.

Optionally, the map data filtering rule comprises: sorting a plurality of pieces of the map data acquired within a preset time period by quality, and filtering out a preset number of pieces of the map data from the sorted results by quality.

The above embodiments of the present disclosure have the following advantages or beneficial effects. Sorting the plurality of pieces of the map data acquired within the preset time period by quality may improve the quality and the success rate for drawing a map to the most extent. Further, by filtering out the preset number of pieces of the map data from the sorted results by quality, a situation in which the data acquisition terminals stay in the target areas of interest temporarily for a long time and acquire redundant and invalid data may be excluded.

According to a second aspect, the embodiments of the present disclosure provide a method for acquiring map data, which is applicable to a data acquisition terminal, comprising: receiving a data acquisition instruction from a server to acquire the map data in target areas of interest, wherein a map to be updated that is stored in the server is divided into at least two areas of interest; acquiring the map data in the target areas of interest according to the data acquisition instruction; and feeding the acquired map data back to the server to enable the server to update the target areas of interest in the map to be updated according to the map data.

According to a third aspect, the embodiments of the present disclosure further disclose an apparatus for acquiring map data, which is incorporated in a server, comprising: a target area of interest determination module, configured to determine target areas of interest in a map, wherein the map is divided into at least two areas of interest; a data acquisition instruction sending module, configured to send a data acquisition instruction to data acquisition terminals to acquire the map data in the target areas of interest; and a map updating module, configured to receive the map data fed back from the data acquisition terminals and to update the target areas of interest in the map according to the map data.

According to a fourth aspect, the embodiments of the present disclosure further disclose an apparatus for acquiring map data, which is incorporated in a data acquisition terminal, comprising: a data acquisition instruction receiving module, configured to receive a data acquisition instruction from a server to acquire the map data in target areas of interest, wherein a map to be updated that is stored in the server is divided into at least two areas of interest; a map data acquisition module, configured to acquire the map data in the target areas of interest according to the data acquisition instruction; and a map data feedback module, configured to feed the acquired map data back to the server to enable the server to update the target areas of interest in the map to be updated according to the map data.

According to a fifth aspect, the embodiments of the present disclosure further disclose an electronic device, comprising: at least one processor; and a storage device connected communicatively to the at least one processor, wherein, the storage device stores instructions executable by the at least one processor, and when the instructions are executed by the at least one processor, the at least one processor may execute the method for acquiring map data according to according to any embodiment of the present disclosure.

According to a sixth aspect, the embodiments of the present disclosure further disclose non-transitory computer-readable storage medium having computer instructions stored thereon, wherein the computer instruction is configured to cause a computer to execute the method for acquiring map data according to any embodiment of the present disclosure.

Other effects of the foregoing optional implementations will be described below with reference to specific embodiments.

BRIEF DESCRIPTION OF THE DRAWINGS

The accompanying drawings are used for a better understanding of the solution, and do not constitute a limitation on the present disclosure.

DETAILED DESCRIPTION

Exemplary embodiments of the present disclosure are described below with reference to the accompanying drawings, which include various details of the embodiments of the present disclosure to facilitate understanding, and the various details should be considered as merely exemplary. Therefore, those skilled in the art should recognize that various changes and modifications may be made to the embodiments described herein without departing from the scope and spirit of the present disclosure. In addition, for clarity and conciseness, descriptions of well-known functions and structures are omitted in the following description.

Embodiment 1

Figure 1:
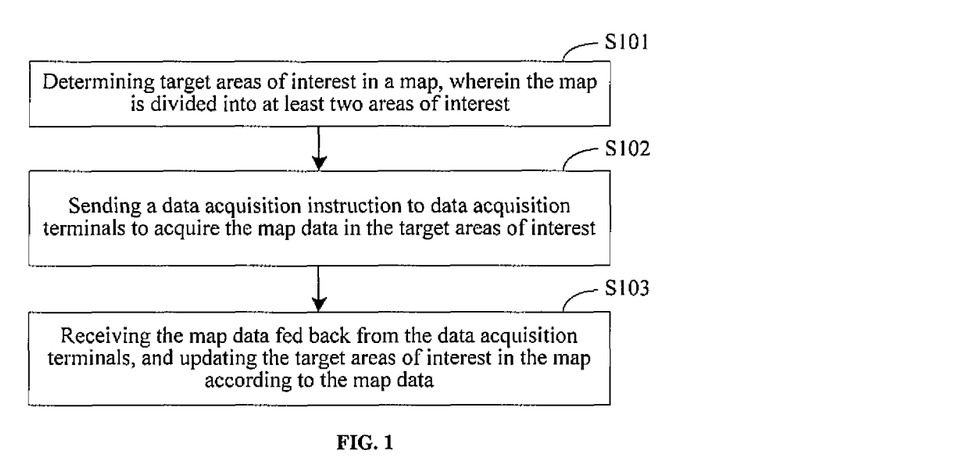
FIG. 1 is a schematic flowchart of a method for acquiring map data according to a first embodiment of the present disclosure.

FIG. 1 is a schematic flowchart of a method for acquiring map data according to a first embodiment of the present disclosure. This embodiment is applicable to a case where a map is updated based on acquired map data by a vehicle. The method is applicable to a server and may be executed by an apparatus incorporated in the server for acquiring map data according to embodiments of the present disclosure. The apparatus may be implemented in software and/or hardware. As shown in FIG. 1, the method may include the following steps.

At block S101, target areas of interest are determined in a map, wherein the map is divided into at least two areas of interest.

The type of the map may include an administrative area map, a street map, or the like. The specific type of the map may be determined depending on service requirements, and is not limited in the embodiments. The areas of interest in the map are pre-divided by technicians according to the type of the map. Generally, the areas of interest are divided differently for different types of maps.

Optionally, when the map is the street map, the areas of interest in the map may be divided on a basis of a topological structure of roads, each area of interest including at least one road. Alternatively, when the map is the administrative area map, the areas of interest in the map may be divided on a basis of scopes of respective administrative areas to obtain the areas of interest with different scopes.

Specifically, determining the target areas of interest includes selecting a fixed number of areas from the areas of interest as the target areas of interest, or selecting the target areas of interest from the areas of interest based on changes in the map data.

Alternatively, block S101 includes: in response to changes in the map data, determining the areas of interest corresponding to the positions of the changes as the target areas of interest. The changes in the map data may be determined according to the number of times to re-plan navigation routes of users. For example, when navigation routes of a plurality of users in an area of interest A are re-planned to be other routes, and the number of times to re-plan is greater than a preset threshold, it may be determined that there are changes occurred in map data corresponding to the area of interest A, owning to such as road repairing or building work. Accordingly, the area of interest A is taken as the target area of interest.

By determining the target areas of interest in the map, a data foundation may be laid for controlling data acquisition terminals to acquire the map data in the target area of interest subsequently.

At block S102, a data acquisition instruction is sent to the data acquisition terminals to acquire the map data in the target areas of interest.

Specifically, the server sends the data acquisition instruction to the data acquisition terminals through wireless transmission technology. The data acquisition instruction is sent to the data acquisition terminals that are in/or not in the target areas of interest. The number of the data acquisition terminals is determined according to redundancy of the map data necessary for updating the map. The data acquisition terminals include vehicle on-board terminals and mobile communication device terminals. The type of the map data may be determined depending on the data acquisition instructions that have been sent for different requirements.

Optionally, the map data includes raw environmental data and/or map-formatted data. The format of the raw environmental data includes at least one of images, laser point cloud data and satellite positioning data. The format of the map-formatted data may be determined according to the data acquisition instructions that have been sent for different requirements, and includes: GDF format, KIWI format, and NavTech format.

Optionally, the data acquisition instruction is sent to the data acquisition terminals in a form of a configuration file.

By sending the data acquisition instruction, the data acquisition terminal may be controlled to acquire the map data in the target areas of interest, so as to obtain the map data necessary for updating the map. In addition, since the acquisition of the map data is performed in the target areas of interest, the technical effect of acquiring the map data as necessary may be achieved, thereby reducing unnecessary acquisition of redundant data.

At block S103, the map data fed back from the data acquisition terminals is received, and the target areas of interest in the map are updated according to the map data.

Specifically, the data acquisition terminals feed the map data back to the server through the wireless transmission technology. After obtaining the map data fed back, the server updates the map in the target areas of interest with CAC (Computer Aided Cartography) technology.

By updating the target areas of interest in the map based on the map data fed back from the data acquisition terminals, the map may be updated in real time, which ensures the accuracy and reliability of the map.

By determining the target areas of interest and sending the data acquisition instruction to the data acquisition terminals to acquire the map data in the target areas of interest, the technical solution according to the embodiments of the present disclosure may achieve the technical effect of acquiring the map data as necessary, thereby reducing unnecessary acquisition of redundant data.

On a basis of the above embodiments, the data acquisition instruction may include a map data filtering rule for instructing the data acquisition terminal to filter the acquired map data according to the map data filtering rule and to feed back the map data filtered.

Specifically, the map data filtering rule includes: sorting a plurality of pieces of the map data acquired within a preset time period by quality, and filtering out a preset number of pieces of the map data from the sorted results by qualities.

Sorting the plurality of pieces of the map data acquired within the preset time period by quality may improve the quality and the success rate for drawing the map to the most extent. Further, by filtering out the preset number of pieces of the map data from the sorted results by quality, a situation in which the data acquisition terminals stay in the target areas of interest temporarily for a long time and acquire redundant and invalid data may be excluded.

On a basis of the above embodiments, block S102 may include: sending the data acquisition instruction carrying identifiers of the target areas of interest to the data acquisition terminals so as to instruct the data acquisition terminals to acquire the map data when the data acquisition terminals are located within the target areas of interest.

Here, the identifiers of the target areas of interest may include position information of the target areas of interest.

Specifically, the server sends the data acquisition instruction carrying the identifiers of the target areas of interest to the data acquisition terminals through the wireless transmission technology. The data acquisition terminals obtain their current positions in real time through a positioning device, and compare the current positions with the position information of the target areas of interest included in the identifiers of the target areas of interest. When the data acquisition terminals determine that their current positions are within the target areas of interest, the acquisition of the map data may be performed immediately.

By instructing the data acquisition terminal to acquire the map data when the data acquisition terminals are located within the target areas of interest according to the identifiers of the target areas of interest such that the data acquisition terminal may perform the acquisition of the map data immediately upon the data acquisition terminal are located within the target areas of interest, the speed of the acquisition of the map data may be increased, thereby improving the efficiency for updating the map.

Embodiment 2

Figure 2:
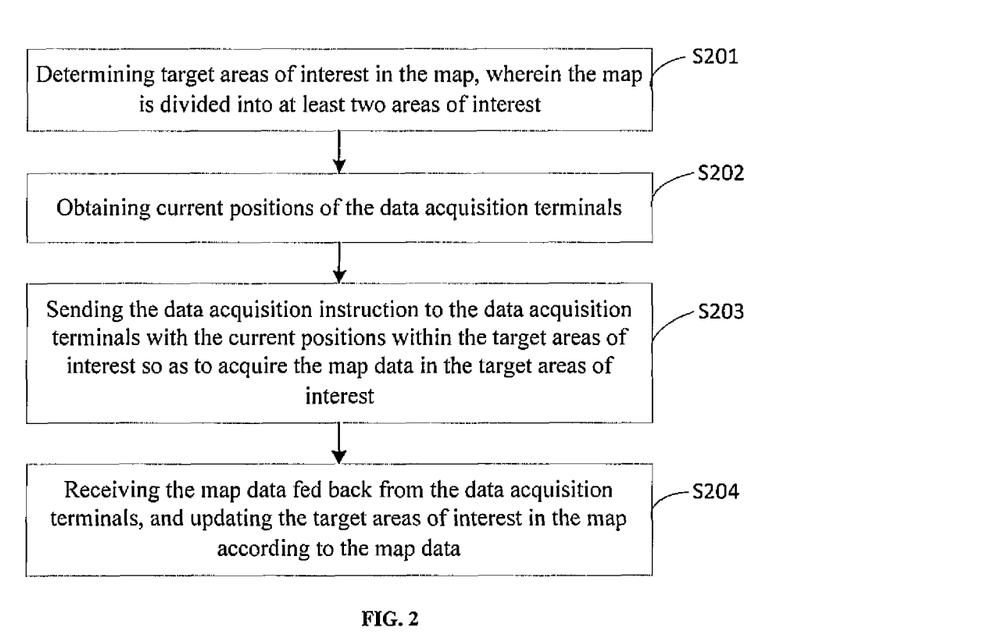
FIG. 2 is a schematic flowchart of a method for acquiring map data according to a second embodiment of the present disclosure.

FIG. 2 is a schematic flowchart of a method for acquiring map data according to a second embodiment of the present disclosure. This embodiment provides a specific implementation for the above embodiment. As shown in FIG. 2, the method may include the following steps.

At block S201, target areas of interest are determined in the map, wherein the map is divided into at least two areas of interest.

At block S202, current positions of the data acquisition terminals are obtained.

Specifically, a positioning device, such as a GPS device, that is incorporated in the data acquisition terminal is controlled to send positioning information to a server. Then, the server determines the current positions of the data acquisition terminal according to the obtained positioning information.

At block S203, the data acquisition instruction is sent to the data acquisition terminals with the current positions within the target areas of interest so as to acquire the map data in the target areas of interest.

For example, assuming that the target areas of interest are area A, area B, and area C, the data acquisition instruction is sent to the data acquisition terminals with the current positions within the area A, area B, and area C according to the current positions of the data acquisition terminals obtained at block S202, so as to acquire the map data in the area A, area B, and area C.

The method for acquiring map data according to this embodiment is applicable to, for example, a case where the data acquisition terminal is included in an autonomous vehicle. In general, the autonomous vehicle runs in a closed region, and thus does not involve a large area. However, the vehicles in the closed region are highly likely to appear at any position in the region.

At block S204, the map data fed back from the data acquisition terminals is received, and the target areas of interest in the map are updated according to the map data.

With the technical solution according to the embodiment of the present disclosure, the data acquisition terminals with the current positions within the target areas of interest are controlled to acquire the map data. In this way, the map data within the target areas of interest may be obtained quickly for updating the map, thereby improving the efficiency for updating the map.

Embodiment 3

Figure 3:
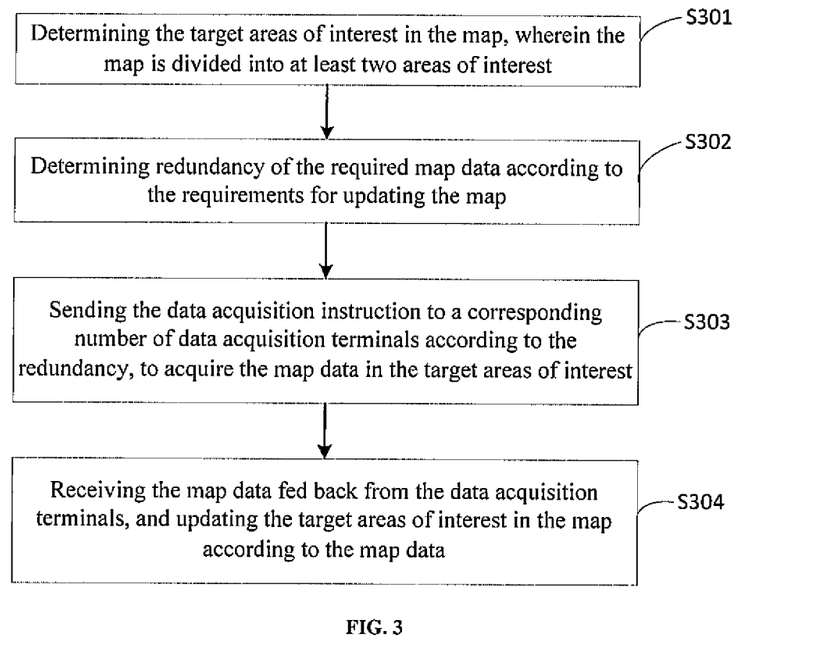
FIG. 3 is a schematic flowchart of a method for acquiring map data according to a third embodiment of the present disclosure.

FIG. 3 is a schematic flowchart of a method for acquiring map data according to a third embodiment of the present disclosure. This embodiment provides a specific implementation for the above embodiment. As shown in FIG. 3, the method may include the following steps.

At block S301, the target areas of interest are determined in the map, wherein the map is divided into at least two areas of interest.

At block S302, redundancy of the required map data is determined according to the requirements for updating the map.

Here, the redundancy of the required map data refers to the number of the data acquisition terminals required for updating the map.

Specifically, different areas of the regions to be updated in the map may require different numbers of the data acquisition terminals. For example, when the area of the region to be updated in the map is large, more data acquisition terminals are required for acquiring the map data so as to ensure the accuracy and reliability of the updated map. Otherwise, for example, when the area of the region to be updated in the map is small, less data acquisition terminals are required for acquiring the map data so as to reduce the acquisition of unnecessary redundant map data.

At block S303, the data acquisition instruction is sent to a corresponding number of data acquisition terminals according to the redundancy, to acquire the map data in the target areas of interest.

For example, assuming that the redundancy of the required map data is five data acquisition terminals, the server may send the data acquisition instruction to five data acquisition terminals randomly through the wireless transmission technology to acquire the map data in the target areas of interest. Alternatively, the server may select five data acquisition terminals from preferred data acquisition terminals, and send the data acquisition instruction to the five data acquisition terminals to acquire the map data in the target areas of interest through the wireless transmission technology. Here, the preferred data acquisition terminals are determined according to a feedback speed of historical map data.

At block S304, the map data fed back from the data acquisition terminals is received, and the target areas of interest in the map are updated according to the map data.

With the technical solution according to the embodiment of the present disclosure, a corresponding number of the data acquisition terminals are controlled according to the redundancy of the required map data so as to acquire the map data. In this way, the map data may be acquired as necessary, thereby avoiding too much unnecessary redundant data to be acquired, and ensuring the accuracy and reliability of the updated map.

Embodiment 4

Figure 4:
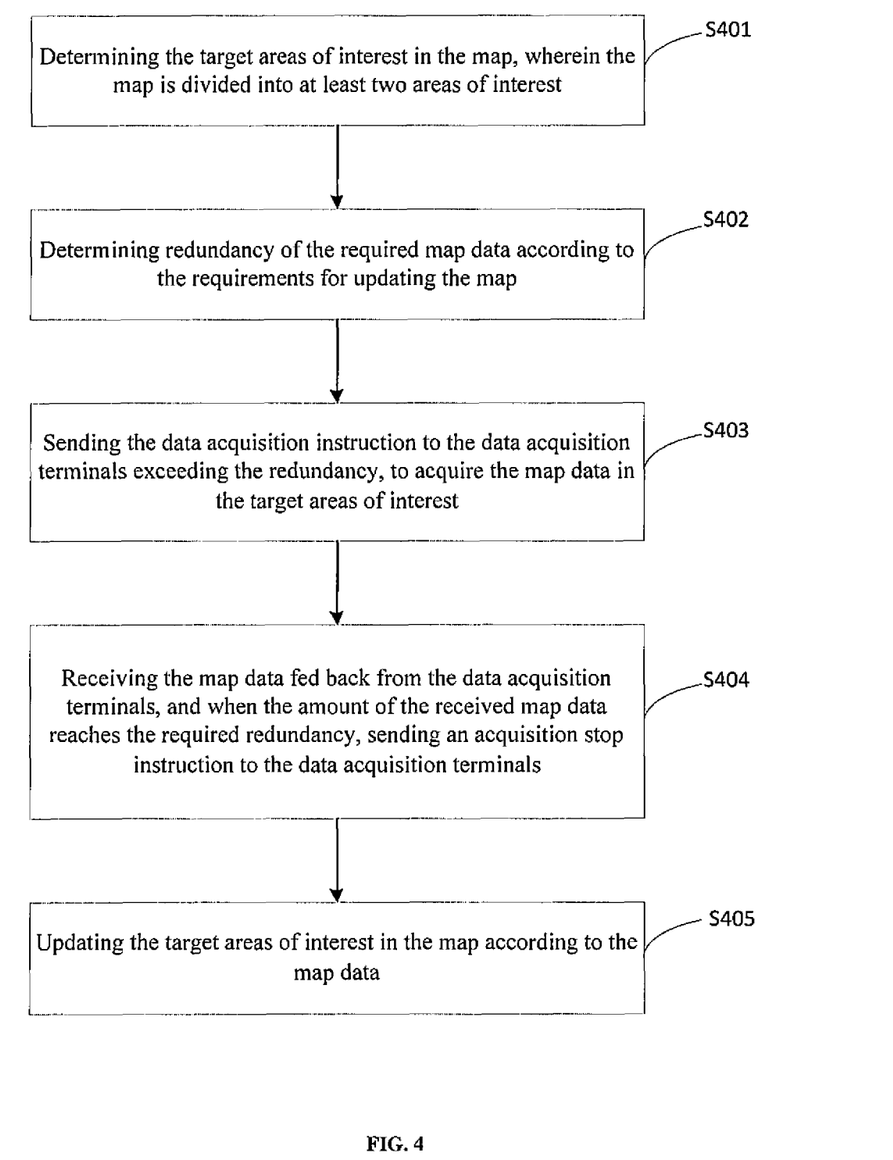
FIG. 4 is a schematic flowchart of a method for acquiring map data according to a fourth embodiment of the present disclosure.

FIG. 4 is a schematic flowchart of a method for acquiring map data according to a fourth embodiment of the present disclosure. This embodiment provides a specific implementation for the above embodiment. As shown in FIG. 4, the method may include the following steps.

At block S401, the target areas of interest are determined in the map, wherein the map is divided into at least two areas of interest.

At block S402, redundancy of the required map data is determined according to the requirements for updating the map.

At block S403, the data acquisition instruction is sent to the data acquisition terminals exceeding the redundancy, to acquire the map data in the target areas of interest.

Specifically, the speeds at which respective data acquisition terminals feed the acquired map data back to the server are different. For example, when the data acquisition terminals are vehicle on-board terminals, a traffic jam may be encountered. In order to ensure that the map data may be fed back to the server quickly, the data acquisition instruction may be sent to the data acquisition terminals exceeding the redundancy so as to acquire the map data in the target areas of interest is.

For example, assuming that the redundancy of the required map data is five data acquisition terminals, the server may send the data acquisition instruction to ten data acquisition terminals randomly through the wireless transmission technology to acquire the map data in the target areas of interest. Alternatively, the server may send the data acquisition instruction to all the data acquisition terminals through the wireless transmission technology to acquire the map data in the target areas of interest.

At block S404, the map data fed back from the data acquisition terminals is received, and when the amount of the received map data reaches the required redundancy, an acquisition stop instruction is sent to the data acquisition terminals.

Specifically, the server would receive the map data fed back from the data acquisition terminals exceeding the redundancy sequentially. However, to reduce the bandwidth occupied by the server, when the amount of the received map data reaches the required redundancy, the acquisition stop instruction may be further sent immediately to the data acquisition terminals to which the data acquisition instruction was sent at block S403, so as to control the data acquisition terminals to stop the acquisition of the map data regardless of the current processing stages of the data acquisition terminals.

For example, assuming that the redundancy of the required map data is five data acquisition terminals, when the amount of map data obtained by the server is equal to the amount of the map data acquired by the five data acquisition terminals, all the data acquisition terminals are controlled to stop the acquisition of the map data immediately.

At block S405, the target areas of interest in the map are updated according to the map data.

With the technical solution according to the embodiment of the present disclosure, the data acquisition terminals exceeding the redundancy are controlled to acquire the map data, which may increase the feedback speed of the acquired map data. When the amount of the received map data reaches the required redundancy, the acquisition stop instruction may be sent to the data acquisition terminals. In this way, the acquisition of the map data may be stopped immediately once the requirements are satisfied, thereby reducing the bandwidth occupied for sending the map data back to the server.

Embodiment 5

Figure 5:
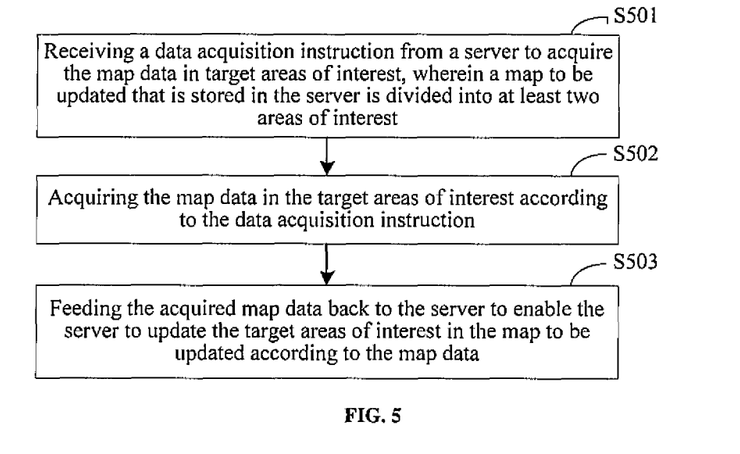
FIG. 5 is a schematic flowchart of a method for acquiring map data according to a fifth embodiment of the present disclosure.

FIG. 5 is a schematic flowchart of a method for acquiring map data according to a fifth embodiment of the present disclosure. This embodiment is applicable to a case where the map is updated based on acquired map data by a vehicle. The method is applicable to a data acquisition terminal, such as vehicle on-board terminals or mobile communication device terminals, and may be implemented by an apparatus incorporated in the data acquisition terminal for acquiring map data according to the embodiments of the present disclosure. The apparatus may be implemented in software and/or hardware. As shown in FIG. 1, the method may include the following.

At block S501, a data acquisition instruction is received from a server to acquire the map data in target areas of interest, wherein a map to be updated that is stored in the server is divided into at least two areas of interest.

Specifically, the server sends the data acquisition instruction to the data acquisition terminals through the wireless transmission technology.

The map to be updated may be an administrative area map, a street map, an indoor map or the like. The specific type of the map may be determined depending on service requirements, and is not limited in the embodiments. The areas of interest in the map to be updated are pre-divided by technicians according to the type of the map. Generally, the areas of interest are divided differently for different types of maps.

Optionally, when the map to be updated is the street map, the areas of interest in the map to be updated may be divided on a basis of a topological structure of roads, each area of interest including at least one road. Alternatively, when the map to be updated is the administrative area map, the areas of interest in the map to be updated may be divided on a basis of scopes of respective administrative areas to obtain the areas of interest with different scopes.

By receiving the data acquisition instruction from the server to acquire the target areas of interest, a foundation may be laid for acquiring the map data in the target area of interest according to the data acquisition instruction subsequently.

At block S502, the map data is acquired in the target areas of interest according to the data acquisition instruction.

Specifically, if the data acquisition terminals have been located within the target areas of interest, the map data may be acquired immediately to obtain the raw environmental data. Otherwise, if the data acquisition terminals are not located within the target areas of interest currently, the map data may not be acquired to obtain the raw environmental data until it is determined that the current positions of the data acquisition terminal are within the target areas of interest. The format of the raw environmental data includes at least one of images, laser point cloud data, and satellite positioning data.

Optionally, block S502 includes: determining the target areas of interest according to the data acquisition instruction; and when it is determined that the current positions of the data acquisition terminals are within the target areas of interest, initiating the acquisition of the map data.

Specifically, the server sends the data acquisition instruction carrying identifiers of the target areas of interest to the data acquisition terminals through wireless transmission technology. The data acquisition terminals obtain their current positions in real time through a positioning device, and compare the current positions with the position information of the target areas of interest included in the identifiers of the target areas of interest. When the data acquisition terminals determine that their current positions are within the target areas of interest, the acquisition of the map data may be performed immediately.

By acquiring the map data in the target areas of interest according to the data acquisition instruction, the map data required for updating the map may be acquired. In addition, since the acquisition of the map data is performed in the target areas of interest, the technical effect of acquiring the map data as necessary may be achieved, thereby reducing unnecessary acquisition of redundant data.

At block S503, the acquired map data is fed back to the server to enable the server to update the target areas of interest in the map to be updated according to the map data.

Specifically, the map data fed back to the server includes the raw environmental data and/or the map-formatted data.

Optionally, block S503 includes: feeding the acquired raw environmental data back to the server; and/or processing the raw environmental data according to a preset map format to form the map-formatted data, and feeding the map-formatted data back to the server.

Specifically, first, the data acquisition terminals transmit the raw environmental data to the server through the wireless transmission technology. The server may update the map in the target areas of interest according to the raw environmental data with the CAC technology preset in the server. By feeding the acquired raw environmental data back to the server, system resources in the data acquisition terminals may be saved. However, since the raw environmental data is at G scale, the amount of data is large, which in turn increases the bandwidth occupied by the server. Second, the data acquisition terminal generates the map-formatted data from the acquired raw environmental data according to the preset map format by using electronic map-making technology preset therein, such as the CAC technology, and then feeds the map-formatted data back to the server. The server may perform the map update in the map to be updated according to the map-formatted data directly. The map format includes GDF format, KIWI format, and NavTech format. By feeding the map-formatted data back to the server, the raw environmental data at G scale may be converted to the map-formatted data at M scale directly, thereby reducing the bandwidth occupied by the server, but instead occupying the system resources of the data acquisition terminal.

The embodiment also provides an alternative solution for the above step of "processing the raw environmental data according to a preset map format to form the map-formatted data", i.e., processing the raw environmental data according to the preset map format to form the map-formatted data in a charge state.

By forming the map-formatted data in the charge state, idle time periods of the data acquisition terminal may be fully utilized, without occupying the system resources in peak periods.

By feeding the acquired map data back to the server to update the target areas of interest in the map, the map may be updated in real time, which ensures the accuracy and reliability of the map.

With the technical solution according to the embodiment of the present disclosure, the data acquisition instruction is received from the server to acquire the map data in the target areas of interest, and the acquired map data in the target areas of interest is fed back to the server. In this way, the technical effect of acquiring the map data as necessary may be achieved, thereby reducing unnecessary acquisition of redundant data.

On a basis of the above embodiment, after block S502, the method may further include:

A. obtaining a map data filtering rule from the data acquisition instruction; and B. filtering the map data according to the map data filtering rule.

Optionally, quality recognition may be performed on a plurality of pieces of the map data acquired within a preset time period according to the map data filtering rule so as to sort the plurality of pieces of the map data according to the results of the quality recognition and to filter out a preset number of pieces of the map data from the sorted results by quality.

Specifically, the quality recognition, including signal strength recognition and confidence recognition of the map data, may be performed on the plurality of pieces of acquired map data. Then, the results of the quality recognition may be sorted from high to low, to select a preset number of pieces of the map data, wherein the preset number of pieces may be specified according to the redundancy of the server, for example, three pieces of map data.

Sorting the plurality of pieces of the map data acquired within the preset time period by quality may improve the quality and the success rate for drawing a map to the most extent. Further, by filtering out the preset number of pieces of the map data from the sorted results by quality, a situation in which the data acquisition terminals stay in the target areas of interest temporarily for a long time and acquire redundant and invalid data may be excluded.

Embodiment 6

Figure 6:
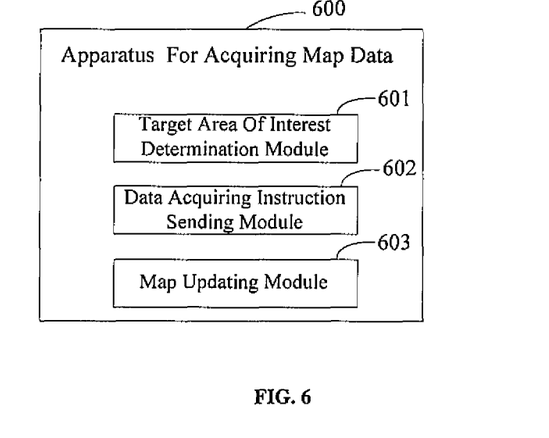
FIG. 6 is a schematic diagram of an apparatus for acquiring map data according to a sixth embodiment of the present disclosure.

FIG. 6 is a schematic diagram of an apparatus 600 for acquiring map data according to a sixth embodiment of the present disclosure. The apparatus 600 is incorporated in a server, and may implement the method for acquiring map data according to any one of embodiments 1 to 4, and have corresponding functional modules and beneficial effects for implementing the method. As shown in FIG. 6, the apparatus may include: a target area of interest determination module 601, a data acquisition instruction sending module 602, and a map updating module 603.

The target area of interest determination module 601 is configured to determine target areas of interest in a map, wherein the map is divided into at least two areas of interest.

The data acquisition instruction sending module 602 is configured to send a data acquisition instruction to data acquisition terminals to acquire the map data in the target areas of interest.

The map updating module 603 is configured to receive the map data fed back from the data acquisition terminals and to update the target areas of interest in the map according to the map data.

On the basis of the above embodiments, the areas of interest in the map are divided on a basis of a topological structure of roads, each area of interest including at least one road.

On the basis of the above embodiments, the target area of interest determination module 601 is configured to: in response to changes in the map data, determine the areas of interest corresponding to the positions of the changes as the target areas of interest.

On the basis of the above embodiments, the map data includes raw environmental data and/or map-formatted data; wherein the format of the raw environmental data includes at least one of images, laser point cloud data and satellite positioning data.

On the basis of the above embodiments, the data acquisition instruction sending module 602 is configured to: obtain current positions of the data acquisition terminal; and send the data acquisition instruction to the data acquisition terminals with the current positions within the target areas of interest so as to acquire the map data in the target areas of interest.

On the basis of the above embodiments, the data acquisition instruction sending module 602 is also configured to: send the data acquisition instruction carrying identifiers of the target areas of interest to the data acquisition terminals so as to instruct the data acquisition terminals to acquire the map data when the data acquisition terminals are located within the target areas of interest.

On the basis of the above embodiments, the data acquisition instruction sending module 602 is also configured to: determine redundancy of the required map data according to the requirements for updating the map; and send the data acquisition instruction to a corresponding number of data acquisition terminals according to the redundancy, to acquire the map data in the target areas of interest.

On the basis of the above embodiments, the data acquisition instruction sending module 602 is also configured to: determine redundancy of the required map data according to updating requirements of the map; and send the data acquisition instruction to the data acquisition terminals exceeding the redundancy, to acquire the map data in the target areas of interest; and after receiving the map data fed back from the data acquisition terminals, the map updating module 603 is configured to: when the amount of the received map data reaches the required redundancy, sending an acquisition stop instruction to the data acquisition terminals.

On the basis of the above embodiments, the data acquisition instruction includes: a map data filtering rule for instructing the data acquisition terminals to filter the acquired map data according to the map data filtering rule and to feed back the filtered map data.

On the basis of the above embodiments, the map data filtering rule includes: sorting a plurality of pieces of the map data acquired within a preset time period by quality, and filtering out a preset number of pieces of the map data from the sorted results by quality.

The apparatus 600 for acquiring map data according to the embodiment of the present disclosure may implement the method for acquiring map data according to any one of embodiments 1 to 4, and have corresponding functional modules and beneficial effects for implementing the method. The technical details that have not described specifically in this embodiment may make reference to the method for acquiring map data according to any one of embodiments 1 to 4 of the present disclosure.

Embodiment 7

Figure 7:
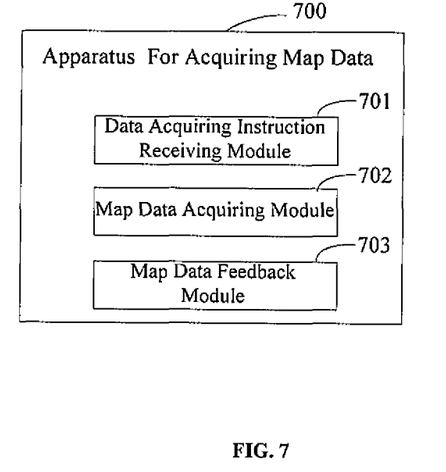
FIG. 7 is a schematic diagram of an apparatus for acquiring map data according to a seventh embodiment of the present disclosure.

FIG. 7 is a schematic diagram of an apparatus 700 for acquiring map data according to a seventh embodiment of the present disclosure. The apparatus 700 is incorporated in an data acquisition terminal, and may implement the method for acquiring map data according to embodiment 5, and have corresponding functional modules and beneficial effects for implementing the method. As shown in FIG. 7, the apparatus may include: a data acquisition instruction receiving module 701, a map data acquisition module 702 and a map data feedback module 703.

The data acquisition instruction receiving module 701 is configured to receive a data acquisition instruction from a server to acquire the map data in target areas of interest, wherein a map to be updated that is stored in the server is divided into at least two areas of interest.

The map data acquisition module 702 is configured to acquire the map data in the target areas of interest according to the data acquisition instruction.

The map data feedback module 703 is configured to feed the acquired map data back to the server to enable the server to update the target areas of interest in the map to be updated according to the map data.

On the basis of embodiment 5, the map data acquisition module 702 is configured to: determine the target areas of interest according to the data acquisition instruction; and when it is determined that the current positions are within the target areas of interest, initiate the acquisition of the map data.

On the basis of embodiment 5, the map data feedback module 703 is configured to: feed the acquired raw environmental data back to the server; and/or process the raw environmental data according to a preset map format to form the map-formatted data, and feed the map-formatted data back to the server.

On the basis of embodiment 5, the map data feedback module 703 is also configured to: process the raw environmental data according to the preset map format to form the map-formatted data in a charge state.

On the basis of embodiment 5, the apparatus further includes a map data filtering module, configured to: obtain a map data filtering rule from the data acquisition instruction; and filter the map data according to the map data filtering rule.

On the basis of embodiment 5, the map data filtering module is configured to: perform quality recognition on a plurality of pieces of the map data acquired within a preset time period according to the map data filtering rule, and sort the plurality of pieces of the map data according to the results of the quality recognition; and filter out and determine a preset number of pieces of the map data from the sorted results by quality.

The apparatus 700 for acquiring map data according to the embodiment of the present disclosure may implement the method for acquiring map data according to embodiment 5, and have corresponding functional modules and beneficial effects for implementing the method. The technical details that have not described specifically in this embodiment may make reference to the method for acquiring map data according to embodiment 5 of the present disclosure.

Embodiments of the present disclosure further provide an electronic device and a readable storage medium.

Figure 8:
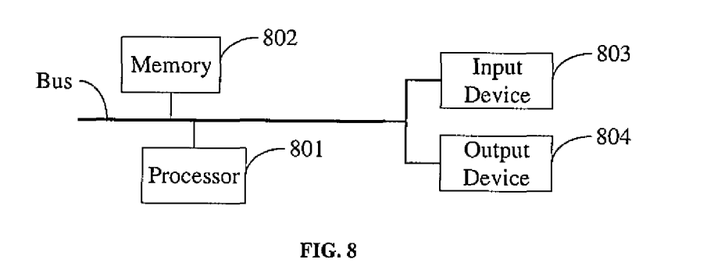
FIG. 8 is a block diagram of an electronic device for implementing a method for acquiring map data according to an embodiment of the present disclosure.

FIG. 8 is a block diagram of an electronic device for implementing a method for acquiring map data according to an embodiment of the present disclosure. The electronic device is intended to represent various forms of digital computers, such as a laptop computer, a desktop computer, a workbench, a personal digital assistant, a server, a blade server, a mainframe computer and other suitable computers. The electronic device may also represent various forms of mobile devices, such as a personal digital processor, a cellular phone, a smart phone, a wearable device and other similar computing devices. Components shown herein, their connections and relationships as well as their functions are merely examples, and are not intended to limit the implementation of the present disclosure described and/or required herein.

As shown in FIG. 8, the electronic device includes: one or more processors 801, a memory 802, and interfaces for connecting various components, including a high-speed interface and a low-speed interface. The components are interconnected by different buses and may be mounted on a common motherboard or otherwise installed as required. The processor may process instructions executed within the electronic device, including instructions stored in or on the memory to display graphical information of the GUI on an external input/output device (such as a display device coupled to the interface). In other embodiments, when necessary, multiple processors and/or multiple buses may be used with multiple memories. Similarly, multiple electronic devices may be connected, each providing some of the necessary operations (for example, as a server array, a group of blade servers, or a multiprocessor system). One processor 801 is taken as an example in FIG. 8.

The memory 802 is a non-transitory computer-readable storage medium according to the embodiments of the present disclosure. The memory stores instructions executable by at least one processor, so that the at least one processor executes the method for acquiring map data according to the embodiments of the present disclosure. The non-transitory computer-readable storage medium according to the present disclosure stores computer instructions, which are configured to make the computer execute the method for acquiring map data according to the embodiments of the present disclosure.

As a non-transitory computer-readable storage medium, the memory 802 may be configured to store non-transitory software programs, non-transitory computer executable programs and modules, such as program instructions/modules (for example, the target area of interest determination module 601, the data acquisition instruction sending module 602, and the map updating module 603 as shown in FIG. 6, and for another example, the data acquisition instruction receiving module 701, the map data acquisition module 702 and the map data feedback module 703 as shown in FIG. 7) corresponding to the method for acquiring map data according to the embodiment of the present disclosure. The processor 801 executes various functional applications and performs data processing of the server by running non-transitory software programs, instructions and modules stored in the memory 802, that is, the method for acquiring map data according to the foregoing method embodiments is implemented.

The memory 802 may include a storage program area and a storage data area, where the storage program area may store an operating system and applications required for at least one function; and the storage data area may store data created according to the use of the electronic device that implements the method for acquiring map data according to the embodiments of the present disclosure, and the like. In addition, the memory 802 may include a high-speed random-access memory, and may further include a non-transitory memory, such as at least one magnetic disk memory, a flash memory device, or other non-transitory solid-state memories. In some embodiments, the memory 802 may optionally include memories remotely disposed with respect to the processor 801, and these remote memories may be connected to the electronic device, which is configured to implement the method for acquiring map data according to the embodiments of the present disclosure, through a network. Examples of the network include, but are not limited to, the Internet, an intranet, a local area network, a mobile communication network, and combinations thereof.

The electronic device configured to implement the method for acquiring map data according to the embodiments of the present disclosure may further include an input device 803 and an output device 804. The processor 801, the memory 802, the input device 803 and the output device 804 may be connected through a bus or in other manners. FIG. 8 is illustrated by establishing the connection through a bus.

The input device 803 may receive input numeric or character information, and generate key signal inputs related to user settings and function control of the electronic device configured to implement the method for acquiring map data according to the embodiments of the present disclosure, such as a touch screen, a keypad, a mouse, a trackpad, a touchpad, a pointing stick, one or more mouse buttons, trackballs, joysticks and other input devices. The output device 804 may include a display device, an auxiliary lighting device (for example, an LED), a haptic feedback device (for example, a vibration motor), and so on. The display device may include, but is not limited to, a liquid crystal display (LCD), a light emitting diode (LED) display and a plasma display. In some embodiments, the display device may be a touch screen.

Various implementations of systems and technologies described herein may be implemented in digital electronic circuit systems, integrated circuit systems, application-specific ASICs (application-specific integrated circuits), computer hardware, firmware, software, and/or combinations thereof. These various implementations may include: being implemented in one or more computer programs that are executable and/or interpreted on a programmable system including at least one programmable processor. The programmable processor may be a dedicated or general-purpose programmable processor that may receive data and instructions from a storage system, at least one input device and at least one output device, and transmit the data and instructions to the storage system, the at least one input device and the at least one output device.

These computing programs (also known as programs, software, software applications, or codes) include machine instructions of a programmable processor, and may implement these calculation procedures by utilizing high-level procedures and/or object-oriented programming languages, and/or assembly/machine languages. As used herein, terms "machine-readable medium" and "computer-readable medium" refer to any computer program product, device and/or apparatus configured to provide machine instructions and/or data to a programmable processor (for example, a magnetic disk, an optical disk, a memory and a programmable logic device (PLD)), and includes machine-readable media that receive machine instructions as machine-readable signals. The term "machine-readable signals" refers to any signal used to provide machine instructions and/or data to a programmable processor.

In order to provide interactions with the user, the systems and technologies described herein may be implemented on a computer having: a display device (for example, a cathode ray tube (CRT) or a liquid crystal display (LCD) monitor) for displaying information to the user; and a keyboard and a pointing device (such as a mouse or trackball) through which the user may provide input to the computer. Other kinds of devices may also be used to provide interactions with the user; for example, the feedback provided to the user may be any form of sensory feedback (e.g., visual feedback, auditory feedback or haptic feedback); and input from the user may be received in any form (including acoustic input, voice input or tactile input).

The systems and technologies described herein may be implemented in a computing system that includes back-end components (for example, as a data server), a computing system that includes middleware components (for example, an application server), or a computing system that includes front-end components (for example, a user computer with a graphical user interface or a web browser, through which the user may interact with the implementation of the systems and technologies described herein), or a computing system including any combination of the back-end components, the middleware components or the front-end components. The components of the system may be interconnected by digital data communication (e.g., a communication network) in any form or medium. Examples of the communication network include: a local area network (LAN), a wide area network (WAN), and the Internet.

Computer systems may include a client and a server. The client and server are generally remote from each other and typically interact through the communication network. A client-server relationship is generated by computer programs running on respective computers and having a client-server relationship with each other.

By determining the target areas of interest and sending the data acquisition instruction to the data acquisition terminals to acquire the map data in the target areas of interest according to the embodiments of the present disclosure, the technical effect of acquiring the map data as necessary may be implemented, thereby reducing unnecessary acquisition of redundant data.

It should be understood that various forms of processes shown above may be reordered, added or deleted. For example, the blocks described in the present disclosure may be executed in parallel, sequentially, or in different orders. As long as the desired results of the technical solution disclosed in the present disclosure may be achieved, there is no limitation herein.

The foregoing specific implementations do not constitute a limit on the protection scope of the present disclosure. It should be understood by those skilled in the art that various modifications, combinations, sub-combinations and substitutions may be made according to design requirements and other factors. Any modification, equivalent replacement and improvement made within the spirit and principle of the present disclosure shall be included in the protection scope of the present disclosure.

What is claimed is:

1. A method for acquiring map data, comprising:
   in response to a plurality of navigation routes for a plurality of users in areas of interest being re-planned to be other navigation routes and a number of times to re-plan being greater than a preset threshold, determining by a server, the areas of interest as target areas of interest in a map, wherein the map is divided into at least two areas of interest;
   determining redundancy of first data acquisition terminals required for updating the map based on a size of the target areas of interest;
   determining second data acquisition terminals based on a feedback speed of historical map data, and selecting a number of first data acquisition terminals corresponding to the redundancy from the second data acquisition terminals;
   sending by the server, a data acquisition instruction to the first data acquisition terminals to acquire raw environmental data in the target areas of interest; and
   receiving by the server, map-formatted map data fed back from the first data acquisition terminals, and updating the target areas of interest in the map according to the map-formatted data, wherein the first data acquisition terminals are configured to process the raw environmental data according to a preset map format to form the map-formatted data when the first data acquisition terminals are in a charge state and feed the map-formatted data back to the server.

2. The method as claimed in claim 1, wherein the areas of interest in the map are divided on a basis of a topological structure of roads, each area of interest comprising at least one road.

3. The method as claimed in claim 1,
   wherein the format of the raw environmental data comprises at least one of images, laser point cloud data and satellite positioning data.

4. The method as claimed in claim 1, wherein sending by the server, the data acquisition instruction to the first data acquisition terminals to acquire the raw environmental data in the target areas of interest comprises:
   obtaining by the server, current positions of the first data acquisition terminal; and
   sending by the server, the data acquisition instruction to the first data acquisition terminals with the current positions within the target areas of interest.

5. The method as claimed in claim 1, wherein sending by the server, the data acquisition instruction to the first data acquisition terminals to acquire the raw environmental data in the target areas of interest comprises:
   sending by the server, the first data acquisition instruction carrying identifiers of the target areas of interest to the first data acquisition terminals so as to instruct the first data acquisition terminals to acquire the raw environmental data when the data acquisition terminals are located within the target areas of interest.

6. The method as claimed in claim 1, wherein the method further comprises:
   sending by the server, the data acquisition instruction to third data acquisition terminals exceeding the redundancy, to acquire map data in the target areas of interest; and
   receiving the map data fed back from the third data acquisition terminals; and
   when the amount of the received map data reaches the required redundancy, sending by the server, an acquisition stop instruction to remaining data acquisition terminals of the third data acquisition terminals.

7. The method as claimed in claim 1, further comprising:
   receiving by the first data acquisition terminals, a data acquisition instruction from the server to acquire the raw environmental data in target areas of interest, wherein a map to be updated that is stored in the server is divided into at least two areas of interest;
   acquiring by the first data acquisition terminals, the raw environmental data in the target areas of interest according to the data acquisition instruction; and
   feeding by the first data acquisition terminals, the map-formatted data back to the server to enable the server to update the target areas of interest in the map to be updated according to the map-formatted data.

8. The method as claimed in claim 7, wherein acquiring by the first data acquisition terminals, the raw environmental data in the target areas of interest according to the data acquisition instruction comprises:
  determining by the data acquisition terminals, the target areas of interest according to the data acquisition instruction; and
  when it is determined that current positions of the first data acquisition terminals are within the target areas of interest, initiating by the first data acquisition terminals, the acquisition of the raw environmental data.

9. The method as claimed in claim 7, after acquiring the raw environmental data in the target areas of interest according to the data acquisition instruction, further comprising:
  obtaining by the first data acquisition terminals, a map data filtering rule from the data acquisition instruction; and
  filtering by the first data acquisition terminals, the raw environmental data according to the map data filtering rule.

10. The method as claimed in claim 9, wherein filtering by the data acquisition terminals, the raw environmental data according to the map data filtering rule:
  performing by the first data acquisition terminals, quality recognition on a plurality of pieces of the raw environmental data acquired within a preset time period according to the map data filtering rule, and sorting by the data acquisition terminals, the plurality of pieces of the raw environmental data according to the results of the quality recognition; and
  filtering out and determining by the first data acquisition terminals, a preset number of pieces of the raw environmental data from the sorted results by quality.

11. An apparatus for acquiring map data, comprising:
  one or more processors; and
  a tangible, non-transitory computer-readable memory for storing instructions executable by the one or more processors to cause the device to perform:
    in response to a plurality of navigation routes for a plurality of users in areas of interest being re-planned to be other navigation routes and a number of times to re-plan being greater than a preset threshold, determining the areas of interest as target areas of interest in a map, wherein the map is divided into at least two areas of interest;
    determining redundancy of first data acquisition terminals required for updating the map based on a size of the target areas of interest;
    determining second data acquisition terminals based on a feedback speed of historical map data, and selecting a number of first data acquisition terminals corresponding to the redundancy from the second data acquisition terminals;
    sending by the server, a data acquisition instruction to the first data acquisition terminals to acquire raw environmental data in the target areas of interest; and
    receiving by the server, map-formatted map data fed back from the first data acquisition terminals, and updating the target areas of interest in the map according to the map-formatted data, wherein the first data acquisition terminals are configured to process the raw environmental data according to a preset map format to form the map-formatted data when the first data acquisition terminals are in a charge state and feed the map-formatted data back to the server.

12. The apparatus as claimed in claim 11, wherein, the one or more processors are further configured to:
  receive a data acquisition instruction from a server to acquire the raw environmental data in target areas of interest, wherein a map to be updated that is stored in the server is divided into at least two areas of interest;
  acquire the raw environmental data in the target areas of interest according to the data acquisition instruction; and
  feed the map-formatted data back to the server to enable the server to update the target areas of interest in the map to be updated according to the map-formatted data.

13. A non-transitory computer-readable storage medium having computer instructions stored thereon, wherein the computer instruction is configured to cause a computer to execute method for acquiring map data, comprising:
  in response to a plurality of navigation routes for a plurality of users in areas of interest being re-planned to be other navigation routes and a number of times to re-plan being greater than a preset threshold, determining the areas of interest as target areas of interest in a map, wherein the map is divided into at least two areas of interest;
  determining redundancy of first data acquisition terminals required for updating the map based on a size of the target areas of interest;
  determining second data acquisition terminals based on a feedback speed of historical map data, and selecting a number of first data acquisition terminals corresponding to the redundancy from the second data acquisition terminals;
  sending by the server, a data acquisition instruction to the first data acquisition terminals to acquire raw environmental data in the target areas of interest; and
  receiving by the server, map-formatted map data fed back from the first data acquisition terminals, and updating the target areas of interest in the map according to the map-formatted data, wherein the first data acquisition terminals are configured to process the raw environmental data according to a preset map format to form the map-formatted data when the first data acquisition terminals are in a charge state and feed the map-formatted data back to the server.

14. The non-transitory computer-readable storage medium as claimed in claim 13, further comprising:
  receiving a data acquisition instruction from a server to acquire the raw environmental data in target areas of interest, wherein a map to be updated that is stored in the server is divided into at least two areas of interest;
  acquiring the raw environmental data in the target areas of interest according to the data acquisition instruction; and
  feeding the map-formatted data back to the server to enable the server to update the target areas of interest in the map to be updated according to the map-formatted data.

* * * * *